(12) United States Patent
Mehta et al.

(10) Patent No.: US 7,951,883 B1
(45) Date of Patent: May 31, 2011

(54) PREPARATION OF MULTIMODAL, HIGH DENSITY, ETHYLENE HOMOPOLYMER BARRIER RESINS AND FILMS

(75) Inventors: Sameer D. Mehta, Mason, OH (US);
Harilaos Mavridis, Lebanon, OH (US);
Jeffrey C. Haley, Cincinnati, OH (US);
Philip J. Garrison, Houston, TX (US);
Jeffrey S. Borke, Middletown, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/592,900

(22) Filed: Dec. 4, 2009

(51) Int. Cl.
*C08F 4/44* (2006.01)
(52) U.S. Cl. ..................................... 526/125.3
(58) Field of Classification Search ................ 526/125.3
See application file for complete search history.

(56) References Cited

U.S. PATENT DOCUMENTS

| 4,223,118 A | 9/1980 | Tsubaki et al. |
| 4,357,448 A | 11/1982 | Tsubaki et al. |
| 4,464,518 A | 8/1984 | Iwabuchi et al. |
| 4,511,669 A | 4/1985 | Gessell |

FOREIGN PATENT DOCUMENTS

EP 0 574 821 11/1998

*Primary Examiner* — Ling-Siu Choi
*Assistant Examiner* — Sonya Wright

(57) ABSTRACT

Disclosed is a multimodal, high density, homopolyethylene barrier resin. The resin is preferably made by a multistage process. The process comprises a first stage in which ethylene is homopolymerized in the presence of a Ziegler-Natta catalyst, organoaluminum cocatalyst, alkoxysilane modifier, and hydrogen. The reaction mixture from the first stage is devolatilized to remove all or substantially all of the hydrogen. The polymerization continues in a second stage wherein ethylene is added to the devolatilized reaction mixture to produce the barrier resin. The barrier resin provides films with improved barrier properties.

14 Claims, No Drawings

PREPARATION OF MULTIMODAL, HIGH DENSITY, ETHYLENE HOMOPOLYMER BARRIER RESINS AND FILMS

FIELD OF THE INVENTION

The invention relates to multimodal, high density, homopolyethylene barrier resins and films. More particularly, the invention relates to multimodal, high density, homopolyethylene barrier resins produced with Ziegler-Natta catalysts in the presence of an alkoxysilane modifier.

BACKGROUND OF THE INVENTION

Polyethylene resins are used to prepare food packaging films, grocery bags, stretch-wrap films, shrink-wrap films, garbage can liners and shipping bags. Some applications, such as wrapping raw or prepared food, require films that have low water vapor and oxygen transmission rates to preserve the contents.

Packaging films with low water vapor transmission rates (WVTR) and low oxygen transmission rates (OTR) are generally produced using laminating foil, metalized films (e.g., aluminum on poly(ethylene terephthalate) or polyethylene), or through the use of metal oxides (e.g., silicon dioxide ($SiO_2$), titanium oxide ($TiO_2$) or aluminum oxide ($Al_2O_3$)), which can be deposited by chemical vapor deposition. The addition of metalized films or metal oxides increases the cost and complexity of producing these films. Polyvinylidene chloride laminated films are also commonly used because of their excellent barrier properties. Although these laminated films have low WVTR and OTR, they tend to be more expensive to produce than polyolefin films.

Multilayer barrier films are also widely used in the packaging industry. Depending on the intended end-use of the film, the number and arrangement of the various layers as well as the types of polymer resins employed will vary. Polymer resins used include a wide variety of polar and non-polar polymers selected for their ability to provide essential properties such as structural integrity, puncture resistance, abrasion resistance, etc. Resins having barrier properties are generally included as a barrier layer to prevent the passage of oxygen and moisture in multi-layer constructions used for food packaging. Commonly used barrier resins for these applications include ethylene-vinyl alcohol (EVOH) copolymers, nylons and the like. Barrier resins usually cost more than polyethylene resins. In addition, multilayer films are made by complex coextrusion processes.

Improving the barrier properties of polyethylene films is of great interest because the improved polyethylene films can be used alone as barrier films or they can be used as layers in multilayer films to improve the overall barrier properties of the multilayer films.

SUMMARY OF THE INVENTION

The invention relates to a multimodal, high density, homopolyethylene barrier resin. The barrier resin has a density greater than or equal to 0.955 g/cm³, a melt index ($MI_2$) less than or equal to 2.5 dg/min, and a melt flow ratio MFR less than or equal to 50. The barrier resin provides films with a water vapor transmission rate less than 0.4 g-mil/100 in²/day. The resin is preferably made by a multistage process. The process comprises a first stage in which ethylene is homopolymerized in the presence of a Ziegler-Natta catalyst, organoaluminum cocatalyst, alkoxysilane modifier, and hydrogen. The hydrogen to ethylene molar ratio in the vapor space of the first stage is within the range of 1 to 6. The homopolyethylene produced in the first stage has a density greater than or equal to 0.96 g/cm³ and a melt index ($MI_2$) greater than or equal to 5 dg/min. The reaction mixture from the first stage is devolatilized to remove all or substantially all of the hydrogen. The polymerization continues in a second stage wherein ethylene and a reduced amount of hydrogen (compared with the first stage) are added to the devolatilized reaction mixture to produce the barrier resin. The second stage polymerization is performed in a hydrogen to ethylene molar ratio in vapor space less than or equal to 0.8.

DETAILED DESCRIPTION OF THE INVENTION

The invention relates to a multimodal, high density, homopolyethylene barrier resin. By multimodal, we mean that the barrier resin comprises at least two homopolyethylene components which differ significantly in molecular weight, preferably showing at least two peak molecular weights by GPC (gel permeation chromatograph) analysis. By homopolyethylene, we mean that the barrier resin comprises less than 2 wt % of any comonomer units and preferably comprises no comonomer units. The barrier resin of the invention has a melt index ($MI_2$) less than or equal to 2.5 dg/min, preferably less than or equal to 2 dg/min, more preferably less than or equal to 1.5 dg/min, and most preferably less than or equal to 1 dg/min. It has a melt flow ratio, MFR, less than 50. MFR measures the molecular weight distribution. A larger MFR indicates a broader molecular weight distribution. MFR is the ratio of the high-load melt index (HLMI) to $MI_2$. The HLMI can be measured according to ASTM D-1238. The HLMI is measured at 190° C. under 21.6 kg of load. The barrier resin has a density greater than or equal to 0.955 g/cm³, preferably within the range of 0.955 g/cm³ to 0.960 g/cm³. The barrier resin provides films with a water vapor transmission rate less than 0.4 g-mil/100 in²/day.

The barrier resin of the invention is preferably produced by a multistage process. By multistage, we mean that the process comprises two or more polymerization stages. In a first stage, ethylene is homopolymerized in the presence of a Ziegler-Natta catalyst, organoaluminum cocatalyst, alkoxysilane modifier, and hydrogen. By homopolymerized, we mean that ethylene is polymerized with less than 2 wt % of any comonomer, preferably less than 1 wt % of any comonomer, and more preferably with no comonomer. The reaction mixture of the first stage is devolatilized to remove all or substantially all of the hydrogen. The polymerization continues in a second stage wherein ethylene and a reduced amount of hydrogen (compared with the first stage) are added to the devolatilized reaction mixture from the first stage to produce the barrier resin.

Suitable Ziegler-Natta catalysts for use in the invention are selected from the group consisting of titanium or vanadium halides, titanium alkoxides, the like, and mixtures thereof. These catalysts are known and described in detail in U.S. Pat. Nos. 4,223,118, 4,357,448, 4,464,518, and 4,511,669, the teachings of which are incorporated herein by reference.

A preferred titanium halide is titanium tetrachloride. When titanium tetrachloride is used, it is preferably supported on or modified with a magnesium compound. Many magnesium compounds suitable for use in supporting or modifying the Ziegler-Natta catalysts are well known. Examples include magnesium chloride, alkyl magnesium halides, and magnesium siloxanes.

Optionally, a Lewis base is included in the catalyst. Preferred Lewis bases are $C_3$-$C_{24}$ esters such as butyl acetate, diethyl phthalate, trimethyl trimellitate and diethyl adipate, and $C_4$-$C_{16}$ ethers such as dibutyl ether, glyme, and diglyme.

More preferred Lewis bases are $C_9$-$C_{24}$ esters such as diethyl phthalate, dioctyl isophthalate and 1,6-hexanediol bisbenzoate.

The titanium halide is preferably supported on magnesium chloride, and the Lewis base, if any, is present in a Lewis base/Ti molar ratio less than 1. The supported titanium compound preferably has a porosity ($P_F$) as determined with the mercury method higher than 0.3 cm$^3$/g, and more preferably within the range of 0.50 cm$^3$/g to 0.80 cm$^3$/g. The total porosity ($P_T$) is preferably with the range of 0.50 cm$^3$/g to 1.50 cm$^3$/g and more preferably within the range of 0.60 cm$^3$/g to 1.20 cm$^3$/g. The surface area as measured by the BET method is preferably less than 80 m$^2$/g and more preferably within the range of 10 m$^2$/g to 70 m$^2$/g. The porosity as measured by the BET method is preferably within the range of 0.10 cm$^3$/g to 0.50 cm$^3$/g and preferably from 0.10 cm$^3$/g to 0.40 cm$^3$/g.

Particles of the magnesium chloride-supported titanium compound preferably have substantially spherical morphology. Average diameters are preferably within the range of 5 μm to 150 μm, and more preferably within the range of 20 μm to 100 μm. "Substantially spherical" particles are those wherein the ratio between the major axis and minor axis is less than or equal to 1.5, preferably less than 1.3.

Suitable titanium alkoxides preferably have the formula $Ti(OR'')_n X_{y-n}$, wherein n has a value from 0.1 to y, y is the valence of titanium, $R''$ is a $C_1$-$C_8$ alkyl, cycloalkyl or aryl radical, and X is halogen. Preferably, $R''$ is ethyl, isopropyl, n-butyl, isobutyl, 2-ethylhexyl, n-octyl, phenyl or benzyl; X is preferably chlorine.

Suitable organoaluminum cocatalysts include those having the general formula of $AlR'_n X_{3-n}$, wherein R' is a $C_1$-$C_8$ hydrocarbon group; X is a halogen or an alkoxy group; and n is 1, 2 or 3. They include trialkyl aluminums, dialkyl aluminum halides, alkyl aluminum dihalides, the like, and mixtures thereof. Examples of suitable cocatalysts are triethylaluminum, tributylaluminum, diethylaluminum chloride, dibutylaluminum chloride, ethylaluminum sesquichloride, diethylaluminum hydride, diethylaluminum ethoxide, the like, and mixtures thereof. Trialkyl aluminum compounds are preferred. Triethylaluminum (TEAL) is particularly preferred. Preferably, the molar ratio of the organoaluminum compound to titanium or vanadium compound is within the range of 0.5:1 to 500:1.

Suitable alkoxysilane modifiers include those having the general formula of $R_{4-y}Si(OR)_y$, wherein y is 2 or 3 and each R is independently a $C_{1-6}$ alkyl or cycloalkyl group. Preferably the alkoxysilane modifier is a monoalkyltrialkoxysilane or dialkyldialkoxysilane. More preferably R is a methyl, ethyl, cyclopentyl or cyclohexyl group or combinations thereof. Preferred alkoxysilanes include cyclohexyl-methyldimethoxysilane (CMDS), methyltriethoxysilane, the like, and mixtures thereof. CMDS is particularly preferred.

The first polymerization stage is preferably performed by adding the catalyst, cocatalyst, and alkoxysilane modifier to the reactor, and continuously adding hydrogen and ethylene to the reactor to give a molar ratio in vapor space from 1 to 6, preferably from 1.1 to 5. The presence of hydrogen reduces the molecular weight of the homopolyethylene produced. The molecular weight can be measured by melt index, $MI_2$. The $MI_2$ is determined according to ASTM D 1238 at 190° C. with 2.16 kg of load. The homopolyethylene produced in the first stage has an $MI_2$ greater than or equal to 5 dg/min, preferably within the range of 5 dg/min to 100 dg/min. It has a density greater than or equal to 0.96 g/cm$^3$, preferably greater than or equal to 0.962 g/cm$^3$, and more preferably greater than or equal to 0.965 g/cm$^3$.

After a desired amount of polymer is produced in the first stage, the reaction mixture is devolatilized to remove all or substantially all of hydrogen. Hydrogen is removed from the reaction mixture so that the polymerization in the second stage can be performed in a reduced hydrogen concentration and produces a second polymer component which has a higher molecular weight than the homopolyethylene made in the first stage.

The polymerization continues in the second stage by adding ethylene and a reduced amount of hydrogen to the devolatilized reaction mixture of the first stage. The second stage is performed in a hydrogen to ethylene molar ratio in the vapor space of less than or equal to 0.8, preferably less than or equal to 0.7, and more preferably less than or equal to 0.6. The catalyst, cocatalyst, and alkoxysilane modifier are carried over from the first stage to the second stage. Additional catalyst, cocatalyst, and alkoxysilane modifier may be added to the second stage, if desirable. The catalyst, cocatalyst and alkoxysilane modifier added to the second stage can be the same as or different from those utilized in the first stage. Preferably from 40 wt % to 60 wt % of the barrier resin is made in the first stage. The homopolyethylene component made in the second stage is mixed in-situ with the homopolyethylene from the first stage to form the multimodal, high density, homopolyethylene barrier resin.

The first and second stages of polymerization can be performed in one reactor or two separate reactors. The polymerizations are preferably conducted in the slurry phase with an inert hydrocarbon medium. Inert hydrocarbons which can be used for the process include saturated aliphatic hydrocarbons such as hexane, isohexane, heptane, isobutane and mixtures thereof. Hexane is a particularly preferred medium. Catalysts and cocatalysts are preferably metered into the reactor dispersed in the same hydrocarbon used as the polymerization medium. The first and second stages of polymerization are also preferably performed in the presence of an antistatic agent. Suitable antistatic agents include those known to the polyolefin industry such as fatty amines.

Preferably, the temperature in the first stage is within the range of 75° C. to 85° C. and, more preferably, within the range of 78° C. to 82° C. The catalyst concentration fed to the reactor is preferably within the range of 0.00003 to 0.001 moles Ti/liter or V/liter and, more preferably from 0.00005 to 0.0005 moles Ti/liter or V/liter. Cocatalysts are preferably used in amounts from 10 to 100 moles per mole of catalyst. The alkoxysilane modifier is preferably present from about 5 to 20 ppm based on the total inert hydrocarbon, and more preferably from 10 to 17 ppm.

Reaction conditions of the second stage may vary from those employed in the first stage. Temperatures preferably are maintained within the range of 68° C. to 82° C., and more preferably within the range of 70° C. to 80° C. Catalyst, cocatalyst, and alkoxysilane modifier levels in the second stage will vary based on concentrations employed in the first stage and whether optional additions are made during the second stage.

The barrier resin of the invention provides films with improved barrier properties compared with those made by similar processes but in the absence of alkoxysilane modifier. The invention includes a barrier film made from the barrier resin. Preferably, the film has a water vapor transmission rate (WVTR) less than 0.4 g-mil/100 in$^2$/day. The WVTR is measured according to ASTM F 1249 at 100% humidity. The film of the invention can be used as a monolayer film. It can also be used as a layer of a multilayer film. The film is useful in many applications. It is particularly useful as packaging film where the improved barrier properties are desirable.

The following examples merely illustrate the invention. Those skilled in the art will recognize many variations that are within the spirit of the invention and scope of the claims.

Example 1

A Ziegler-Natta catalyst is prepared by reacting or mixing titanium tetrachloride, ethylaluminum dichloride, polymethylhydridosiloxane, dibutyl magnesium, ethylaluminium dichloride, and tetraisopropyltitanate in accordance with the general procedure disclosed in U.S. Pat. No. 4,511,669. The catalyst is slurried with hexane to the desired titanium concentration. Hexane, the catalyst slurry, triethylaluminum (TEAL) cocatalyst, cyclohexylmethyldimethoxy-silane (CMDS) modifier, ethylene, hydrogen and antistatic agent (oleylbis(2-hydroxyethyl)amine) are continuously fed to a first reactor in amounts given in Table 1 to produce a low molecular weight, homopolyethylene component. Melt index $MI_2$ and density of the first homopolyethylene component are listed in Table 1.

The reaction mixture from the first reactor is continuously transferred to a flash drum where hydrogen and unreacted ethylene are removed. The reaction mixture recovered from the flash drum containing the homopolyethylene, the catalyst, cocatalyst, CMDS and antistatic agent in hexane is then transferred to a second reactor to which fresh hexane, ethylene and hydrogen are added to produce a bimodal, high density, homopolyethylene barrier resin. $MI_2$, HLMI, and density of the barrier resin product are listed in Table 1.

The barrier resin is fabricated into 1.25 mil thick films on a monolayer blown film line equipped with a 10.2 cm diameter die set with a 1.5 mm die gap. The die is fed by a 5.1 cm Battenfeld extruder with a barrier flighted mixing screw and an L/D of 24:1. Films are blown "in the pocket" at a rate of 23 kg/hr using a 2.2:1 blow-up ratio and a 20 cm frost line height. Water vapor transmission rates (WVTR) are measured at 100% relative humidity following the method of ASTM F1249.

Comparative Example 2

Example 1 is repeated but without using the alkoxysilane modifier. The comparative run targets a final resin product having an $MI_2$ and density as close as possible to that provided in Example 1. Feed rates and polymerization conditions employed in the first and second reactors and properties of the first homopolyethylene component and final barrier resin product are reported in Table 1.

Example 3

Example 1 is essentially repeated but the catalyst is prepared by reacting or mixing titanium tetrachloride, ethylaluminum dichloride, polymethylhydridosiloxane, dibutyl magnesium, ethylaluminium dichloride, ethanol and isopropanol in accordance with the general procedure disclosed in U.S. Pat. No. 4,464,518 and diluted with hexane to the desired titanium concentration. Feed rates and polymerization conditions employed in the first and second reactors and properties of the first homopolyethylene component and final barrier resin product are reported in Table 1.

TABLE 1

| | Ex. 1 | C. Ex. 2 | Ex. 3 |
|---|---|---|---|
| First Reactor Polymerization | | | |
| Pressure (psig) | 90 | 71 | 106 |
| Temperature (° C.) | 80 | 80 | 80 |
| Ethylene (lbs/hr) | 29.2 | 29.2 | 29.4 |
| Antistatic agent (lbs/hr) | 0.0016 | 0.0018 | 0.007 |
| Hexane (lbs/hr) | 166 | 166 | 166 |
| Catalyst Slurry (moles Ti/hr) | 0.00169 | 0.00125 | 0.00372 |
| Cocatalyst (moles/hr) | 0.066 | 0.085 | 0.159 |
| CMDS (ppm based on hexane) | 16 | 0 | 16 |
| H2/Ethylene molar ratio (vapor space) | 1.9 | 2.1 | 2.7 |
| First Reactor Polymer Properties | | | |
| $MI_2$ (g/10 min) | 14 | 14 | 46 |
| Density (g/cm$^3$) | 0.964 | 0.963 | 0.967 |
| Second Reactor Polymerization | | | |
| Pressure (psig) | 81 | 62 | 64 |
| Temperature (° C.) | 80 | 80 | 77 |
| Ethylene (lbs/hr) | 35.8 | 35.8 | 35.8 |
| Hexane (lbs/hr) | 220 | 220 | 220 |
| H2/Ethylene molar ratio (vapor space) | 0.50 | 0.55 | 0.42 |
| Properties of Final Barrier Resins and Films | | | |
| Wt % of Polymer produced in First Reactor | 45 | 45 | 45 |
| MI (g/10 min) | 0.94 | 0.98 | 0.74 |
| HLMI (g/10 min) | 36 | 51 | 32 |
| MFR | 38 | 52 | 43 |
| Density (g/cm$^3$) | 0.959 | 0.958 | 0.959 |
| WVTR (g-mil/100 in$^2$/day) | 0.38 | 0.45 | 0.30 |

We claim:

1. A multimodal, high density, homopolyethylene barrier resin having a density greater than or equal to 0.955 g/cm$^3$, an melt index $MI_2$ less than or equal to 2.5 dg/min, and a melt flow ratio MFR less than or equal to 50; said barrier resin providing a film with a water vapor transmission rate less than 0.4 g-mil/100 in$^2$/day, wherein the barrier resin is made by a process comprising (a) polymerizing ethylene in the presence of a Ziegler-Natta catalyst selected from the group consisting of titanium halides, titanium alkoxides, vanadium halides, and mixtures thereof, an organoaluminum cocatalyst, hydrogen, and an alkoxysilane modifier in a hydrogen to ethylene molar ratio in vapor space within the range of 1 to 6, to produce a homopolyethylene having a density greater than or equal to 0.96 g/cm$^3$ and a melt index $MI_2$ greater than or equal to 5 dg/min; (b) devolatilizing the reaction mixture to remove hydrogen; and (c) continuing the polymerization by adding ethylene and hydrogen to the devolatilized reaction mixture in a hydrogen to ethylene molar ratio in vapor space less than or equal to 0.8 to form the barrier resin.

2. The barrier resin of claim 1, having an $MI_2$ less than or equal to 1 dg/min.

3. The barrier resin of claim 1, having a density within the range of 0.955 g/cm$^3$ to 0.960 g/cm$^3$.

4. The barrier resin of claim 1, having an $MI_2$ less than or equal to 1.5 dg/min.

5. The barrier resin of claim 1, wherein step (a) is performed in the presence of an antistatic agent.

6. The barrier resin of claim 1, wherein the alkoxysilane has the general formula $R_{4-y}Si(OR)_y$, where y is 2 or 3 and R is independently an alkyl or cycloalkyl group.

7. The barrier resin of claim 6, wherein the alkoxysilane is selected from the group consisting of cyclohexylmethyldimethoxysilane, methyltriethoxysilane, and mixtures thereof.

8. The barrier resin of claim 7, wherein the alkoxysilane is cyclohexylmethyldimethoxysilane.

9. The barrier resin of claim 1, comprising from 40 wt % to 60 wt % of the homopolyethylene made in step (a).

10. The barrier resin of claim 1, wherein the homopolyethylene made in step (a) has a melt index $MI_2$ within the range of 5 dg/min to 200 dg/min.

11. The barrier resin of claim 1, wherein steps (a) to (b) are performed in slurry phase.

12. A film made from the barrier resin of claim 1.

13. The film of claim 12 having a water vapor transmission rate less than 0.4 g-mil/100 $in^2$/day.

14. A multilayer film comprising a layer of the film of claim 12.

* * * * *